United States Patent
Derango et al.

(10) Patent No.: US 7,120,147 B2
(45) Date of Patent: Oct. 10, 2006

(54) RESERVATION PROXY FUNCTION SUPPORTING FILTERING OF MULTICAST TRAFFIC IN PACKET-BASED COMMUNICATION SYSTEMS

(75) Inventors: Mario F. Derango, Wauconda, IL (US); Michael F. Korus, Eden Prarie, MN (US)

(73) Assignee: Motorola, Inc., Schaumburg, IL (US)

( * ) Notice: Subject to any disclaimer, the term of this patent is extended or adjusted under 35 U.S.C. 154(b) by 966 days.

(21) Appl. No.: 10/058,574

(22) Filed: Jan. 28, 2002

(65) Prior Publication Data

US 2003/0142671 A1 Jul. 31, 2003

(51) Int. Cl.
- H04L 12/28 (2006.01)
- H04L 12/56 (2006.01)
- H04J 3/26 (2006.01)
- H04J 1/16 (2006.01)
- H04J 3/14 (2006.01)

(52) U.S. Cl. ............. 370/390; 370/432; 370/468; 709/226

(58) Field of Classification Search ......... 370/468, 370/390, 432, 401; 709/226, 229, 238
See application file for complete search history.

(56) References Cited

U.S. PATENT DOCUMENTS

| | | | | |
|---|---|---|---|---|
| 6,058,113 A | * | 5/2000 | Chang | 370/390 |
| 6,101,549 A | * | 8/2000 | Baugher et al. | 709/238 |
| 6,298,058 B1 | * | 10/2001 | Maher et al. | 370/390 |
| 6,411,616 B1 | * | 6/2002 | Donahue et al. | 370/352 |
| 6,600,735 B1 | * | 7/2003 | Iwama et al. | 370/352 |
| 6,704,576 B1 | * | 3/2004 | Brachman et al. | 455/503 |
| 6,765,927 B1 | * | 7/2004 | Martin et al. | 370/469 |
| 6,791,980 B1 | * | 9/2004 | Li | 370/390 |
| 6,791,981 B1 | * | 9/2004 | Novaes | 370/390 |
| 6,854,013 B1 | * | 2/2005 | Cable et al. | 709/226 |
| 2002/0085506 A1 | * | 7/2002 | Hundscheidt et al. | 370/254 |
| 2002/0186694 A1 | * | 12/2002 | Mahajan et al. | 370/390 |

* cited by examiner

Primary Examiner—Chirag G. Shah
(74) Attorney, Agent, or Firm—Steven R. Santema; Indira Saladi

(57) ABSTRACT

Call control methods are disclosed for a multi-zone, packet-based communication system using zone controller/RPEs incorporating a reservation proxy function. Participating zone controller/RPEs (124–130) receive and join a multicast group address to be used for a call, and exchange RSVP signaling messages across one or more inter-zone, packet network links (148, 150, 152, 154) to reserve communication resources for the call on behalf of participating devices in various zones. In the preferred embodiment, the zone controllers use IGMPv3 messages to specify other participating zone controllers as valid senders, thereby receiving desired control information for the duration of the call without being encumbered by undesired payload information.

12 Claims, 5 Drawing Sheets

RESERVATION PROXY FUNCTION SUPPORTING FILTERING OF MULTICAST TRAFFIC IN PACKET-BASED COMMUNICATION SYSTEMS

CROSS-REFERENCE TO RELATED APPLICATIONS

This invention is related to U.S. patent application Ser. No. 09/891,645, titled "Methods for Managing Bandwidth in a Packet-Based Communication System Incorporating a Reservation Proxy Function," filed Jun. 26, 2001; U.S. patent application Ser. No. 09/728,621, titled "Method for Managing Bandwidth in a Packet-Based Communication System," filed Dec. 1, 2000; and U.S. patent application Ser. No. 09/728,620, titled "Method for Managing Bandwidth in a Packet-Based Communication System Using Call Unit Reservations," filed Dec. 1, 2000, each assigned to the assignee of the present invention and incorporated herein by reference in their entirety.

FIELD OF THE INVENTION

This invention generally relates to packet-based communication systems and, in particular, to a method of providing admissions control in a packet-based communication system using a reservation proxy function.

BACKGROUND OF THE INVENTION

Communication systems typically include a plurality of communication units, such as mobile or portable radio units, dispatch consoles and base stations (sometimes called base site repeaters) that are geographically distributed among various base sites and console sites. The radio units wirelessly communicate with the base stations and each other using radio frequency (RF) communication resources, and are often logically divided into various subgroups or talkgroups.

Communication systems are often organized as trunked systems, where the RF communication resources are allocated on a call-by-call basis among multiple users or groups. Wide-area trunked systems are sometimes organized into a plurality of "zones," wherein each zone includes multiple sites and a central controller or server ("zone controller") for allocating communication resources among the multiple sites. The zone controller(s) may reside within a single device or multiple devices and may be located at a fixed equipment site or may be distributed among various base sites. The RF resources may comprise, for example, narrow band frequency modulated channels, wideband modulated signals, broadband modulated signals, time division modulated slots, carrier frequencies, frequency pairs, or generally any medium for communicating information, such as voice, video, or data traffic ("payload information") or control signaling ("control information") to and from participating communication devices over wireless link(s).

In recent years, communication systems have been implemented using packet-switched technology where information that is to be communicated between endpoints is divided into packets and transported by various routers forming an Internet Protocol (IP) network. Packet-switched networks are sometimes called "connectionless" networks because they do not provide dedicated bandwidth or circuits between endpoints, but rather permit communications between multiple endpoints to proceed concurrently over shared paths or connections. The endpoints (or "hosts" in IP terminology) may comprise, for example, base stations, consoles, routers, zone controllers, and in some instances, wireless mobile or portable radio units in different zones that desire to receive packets for a particular call. In such systems, the participating hosts send Internet Group Management Protocol (IGMP) Join messages to attached routers, causing the routers of the network to create a spanning tree of router interfaces for distributing packets for the call.

Due to the "connectionless" nature of IP packet-based networks, it is possible to over-subscribe certain links including, but not limited to, inter-zone links between multiple hosts. Generally, in any packet-based system, over-subscription of link(s) causes delays in transport of IP packets that adversely effect the quality of service of the network. The problem is most acute in large systems including multiple hosts distributed among several sites and/or zones. In such systems, inter-zone links between remote hosts are usually leased by communication system customer (s). Understandably, customers demand a certain quality of service and are more willing to occasionally queue (or "busy") inter-zone calls due to insufficient resources than to pay extra recurring costs to overprovision these links to accommodate peak traffic loads. Accordingly, there is a need for a method of admission control in an IP packet-based communication system that provides for establishing calls over shared links of an IP network without exceeding available bandwidth.

One manner of addressing these needs is described in related patent application Ser. No. 09/891,645, wherein reservations of bandwidth are established dynamically (i.e., on a call-by-call basis) for certain links by a certain host devices (termed reservation proxy elements, or RPEs) on behalf of other participating hosts (e.g., base stations, etc.) that may require use of bandwidth. The reservations of call units are established by the RPEs using standard ReSerVation Setup Protocol (RSVP) signaling using multicast group address(es) that are used for actual calls. The RPEs join a multicast group address that is to be used for a call and exchange RSVP signaling messages across one or more inter-zone, packet network links to reserve communication resources for the call on behalf of participating devices in various zones. The RPE function may reside within the zone controllers or separate infrastructure device(s) of different communication zones.

Advantageously, the reservation proxy operation enables bandwidth reservations made by the RPEs to be exploited by other hosts of the network without the need for separate RSVP transactions, and hence without additional network loading. A problem that arises, however, is that the operation described in the Ser. No. 09/891,645 application does not provide for the RPEs to specify any filtering of multicast traffic. Consequently, the RPEs (while joined to the multicast group address) will continue to receive all payload and control information directed to the multicast group address even though, generally, it is undesirable for the RPEs to receive payload information since this negatively impacts in control processing capacity. Optionally, the RPEs may leave the multicast group address after establishing the RSVP reservations so as to discontinue receiving payload information, but this will also result in discontinuing control information that may be necessary for the RPEs to perform further resource management or control functions for the call.

For example, roaming of radio units between different communication zones may occur such that new links need to be established (or old links torn down) during a call. Typically, the location of the radio units is tracked by zone controller(s) and, if necessary, changes are communicated to other zone controllers and/or RPEs via control messages. If any RPEs were to leave the multicast group address after establishing the RSVP reservations for a particular topology, they would be unaware of the new topology and thus would be unable to accommodate resource management functions for the new topology. This problem would occur whether the RPEs reside within one or more zone controllers (e.g., upon certain zone controller(s) no longer being able to track location, or no longer exchange control messages with other zone controllers) or within separate devices (e.g., upon the RPEs no longer receiving control information from zone controllers).

Accordingly, there is a need for a reservation proxy operation whereby RPEs make bandwidth reservations on behalf of other hosts in the network, but which allows the RPEs to specify filtering of multicast traffic. Advantageously, the reservation proxy operation will enable RPE/zone controllers to receive desired control information for the duration of the call without being encumbered by undesired payload information. The present invention is directed to addressing these needs.

BRIEF DESCRIPTION OF THE DRAWINGS

The foregoing and other advantages of the invention will become apparent upon reading the following detailed description and upon reference to the drawings in which.

DESCRIPTION OF PREFERRED EMBODIMENTS

Figure 1:
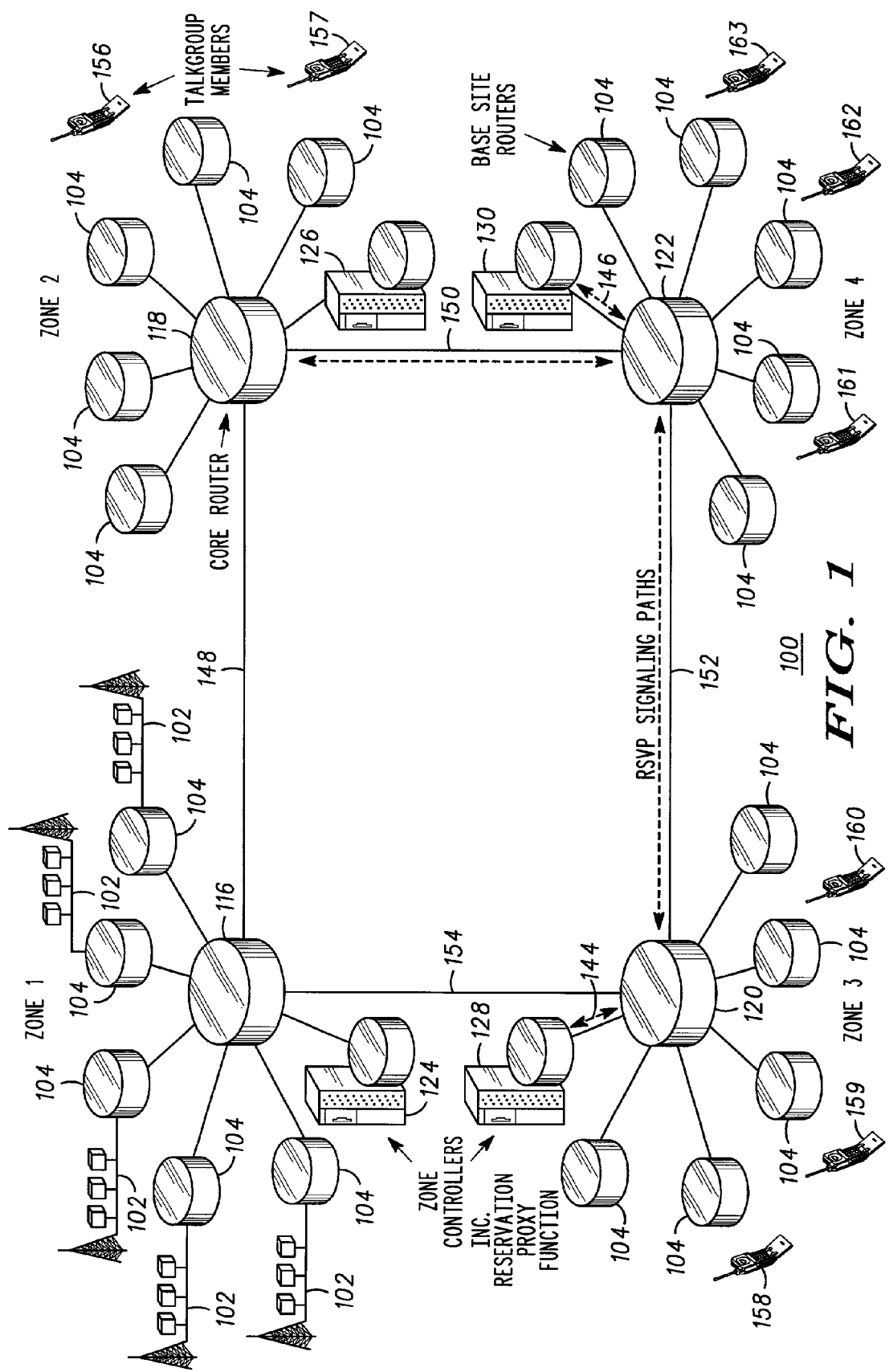
FIG. 1 shows a multi-zone packet-based communication system incorporating a reservation proxy function within respective zone controllers according to one embodiment of the invention.

FIG. 1 shows by way of example and not limitation, a packet-based communication system 100 comprising a plurality of base sites 102 organized into a plurality of zones ("Zone 1" through "Zone 4"). For convenience, the base sites 102 are shown only at Zone 1, although it will be understood that base sites are also at Zones 2, 3 and 4. The base sites 102 include base stations 106 for communicating via RF resources with wireless communication units (e.g., communication units 156–163) within their respective coverage areas, which communication units may roam from site to site and from zone to zone.

The base sites 102 are logically coupled, via router elements 104 ("base site routers") to router elements 116, 118, 120, 122 ("core routers") associated with their respective zones. The core routers are logically connected via packet network (inter-zone) links 148, 150, 152, 154. The core routers 116, 118, 120, 122 are connected to respective zone controllers 124, 126, 128, 130 that perform call processing and mobility management functions for communication units within their respective zones.

In the preferred embodiment, the zone controllers 124, 126, 128, 130 further perform reservation proxy functions associated with the respective zones 1–4. Alternatively or additionally, reservation proxy functions may be incorporated within separate physical devices including, but not limited to console(s), call logger(s) and/or other infrastructure device(s) that may be included within the communication system 100. For convenience, device(s) incorporating reservation proxy functionality will be referred to as reservation proxy elements ("RPEs"). In one embodiment, as will be described in greater detail in relation to FIG. 3, the RPEs use RSVP signaling to dynamically obtain reservations of bandwidth on one or more of the inter-zone links 148, 150, 152, 154 for a prospective call or, as described in relation to FIG. 5, to obtain bandwidth reservations for a link to a new zone. The RSVP message sequence is described generally in relation to FIG. 2.

The base site routers 104 and the core routers 116, 118, 120, 122 are functional elements that may be embodied in separate physical devices or combinations of such devices, which devices comprise specialized or general purpose computing devices configured to receive IP packets from a particular host in the communication system 100 and relay the packets to another router or another host in the communication system 100. Packets may be distributed between zones using sparse mode routing protocols such as the Core Based Tree (CBT) protocol and the Protocol Independent Multicast—Sparse Mode (PIM-SM) protocol, dense mode routing protocols such as the Distance Vector Multicast Routing Protocol (DVMRP), Protocol Independent Multicast—Dense Mode (PIM-DM) and the Multicast Open Shortest Path First (MOSPF) protocol, or virtually any other protocol suitable for transporting packets between hosts of the communication system 100.

In one embodiment, the base stations 106, base site routers 104, core routers 116, 118, 120, 122, and zone controller/RPEs 124, 126, 128, 130 of the communication system 100, as well as any consoles or wireline devices that may be included the communication system 100 comprise IP host devices that are able to send and receive IP packets or datagrams between other host devices of the network. Recent advances in technology have also extended IP host functionality to wireless communication units, in which case the wireless communication units 156–163 may comprise host devices as defined herein. Each host device has a unique IP address. The host devices include respective processors (which may comprise, for example, microprocessors, microcontrollers, digital signal processors or combination of such devices) and memory (which may comprise, for example, volatile or non-volatile digital storage devices or combination of such devices).

Generally, any host device, including base stations, consoles, zone controllers, and in some instances, wireless mobile or portable radio units in different zones that desires to receive packets for a particular call, sends Internet Group Management Protocol (IGMP) Join messages to their attached routers, indicating a desire to join a multicast group address for the call. The routers of the network, in turn, create a spanning tree of router interfaces for distributing packets for the call.

In one embodiment, the zone controller/RPEs utilize the IGMPv3 protocol (defined in the IETF draft draft-ietf-idmr-igmp-v3-08.txt) to join the multicast group address associated with the call. The IGMPv3 protocol permits certain host(s) to specify senders from which packets addressed to the multicast group address are eligible to be received during the prospective call, thereby effectively instructing the routers of the network to filter out traffic from source(s) other than the eligible senders.

In one embodiment, for example, as will be described in greater detail in relation to FIG. 3, the zone controller/RPEs specify only other zone controller/RPEs as valid senders so as to receive RSVP signaling and call admission control related traffic from other zone controller/RPEs while filtering out traffic from base stations, consoles, radio units, etc. In one embodiment, this is accomplished by the zone controller/RPEs issuing respective IGMPv3 Membership Report messages (type=Mode_is_include) which includes a list of the source addresses for all the other zone controller/RPEs participating in the call (or optionally all the zone controller/RPEs in the system if the system is small). This IGMPv3 message will effectively tell the routers of the IP network to filter out all multicast bearer traffic from sources other than the zone controllers.

Figure 2:
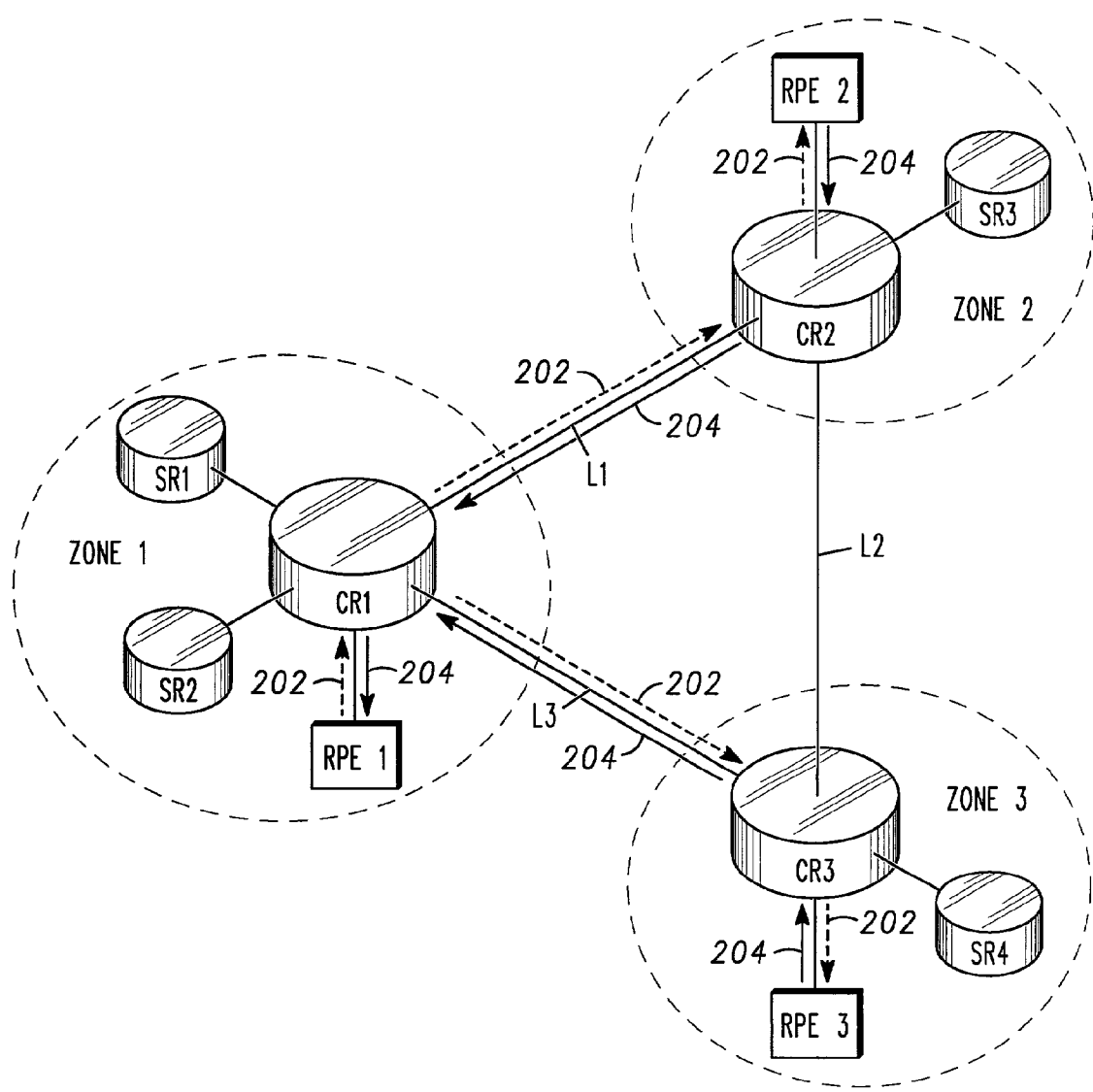
FIG. 2 is a block diagram useful for illustrating an RSVP message sequence between RPEs and routers of a multi-zone packet-based communication system.

Turning now to FIG. 2, there is shown a simplified packet-based communication system 200 useful for showing an RSVP message sequence between RPEs (e.g., RPE 1, RPE 2, RPE 3) in multiple zones (e.g. Zones 1–3) connected by packet network inter-zone links (e.g., L1, L2, L3). In one embodiment of the present invention, an RSVP message sequence is used to dynamically obtain reservations of bandwidth on one or more inter-zone links (e.g., L1, L3). The RSVP protocol itself is described in detail in IETF RFC 2205, incorporated herein by reference.

As shown in FIG. 2, the RSVP message sequence is initiated by sourcing RPE 1 sending an RSVP "path" message202 its associated core router CR1. In one embodiment, the path message 202 is addressed to a multicast group address that is to be used for a prospective communication. The routers of the network forward the path message 202 to participating RPEs (e.g., RPE 2 and RPE 3) having joined the multicast address. Thus, in the present example, the path message 202 is routed across the link L1 to core router CR2 and across link L3 to core router CR3. In turn, CR2 and CR3 send the path message to RPE 2 and RPE 3.

Upon receiving the path message, RPE 2 and RPE 3 send RSVP "reserve" messages 204 back to RPE 1, which reserve messages essentially retrace the path as the path messages but in a reverse direction. Thus, in the present example, the reserve messages 204 are sent from RPE 2 to CR2 and from RPE 3 to CR3, then from CR2 to CR1 across the link L1 and from CR3 to CR1 across the link L3 and finally from CR1 to RPE 1. RPE 2 and RPE 3 receive confirmation from the network once the reservation is established. Thereafter, if bandwidth is available, the RPEs may set up a call between participating devices (in the case where the RPE resides within respective zone controllers, as will be described in FIG. 3). Alternatively, in the case where the RPEs reside within devices other than zone controllers, the RPEs may assist in setting up a call by informing their associated zone controllers that bandwidth is available for a prospective call and, having been informed of resource availability, the zone controller(s) set up the call.

According to RSVP protocols, three types of reserve messages may be used: Wildcard Filter (WF), Shared Explicit (SE) or Fixed Filter (FF), each of which will result in a specific type of data flow behavior as follows:

The WF style allows the same resource reservation to be shared by multiple senders. Valid senders are not specified in the reservation. In effect, the reservation provides a shared pipe, whose size is determined by the largest reservation in the session, independent of the number and identity of the senders. Thus, for example, a reservation of bandwidth on link L1 using the WF style would allow for any sending host (e.g., site router SR1 or SR2) to use the reservation without RPE 2 having specified SR1 or SR2 in the reservation.

The SE style is similar to WF, except the receiver is allowed to specify which hosts are to be included in the reservation. Thus, for example, SR1 and SR2 might be specified as eligible senders by RPE 2 using the SE style of reserve message. The SE style assumes multiple hosts will not send simultaneously. Thus, in the present example, the SE style of reservation might reserve a single call unit of bandwidth on link L1 which is eligible for use by either SR1 or SR2, but not SR1 and SR2 simultaneously.

The FF style creates distinct reservations for each sender in the session. Individual senders are specified in the reservation request message. Thus, for example, if SR1, SR2 are specified as eligible senders by RPE 2, the FF style of reservation might reserve two call units of bandwidth on link L1, i.e., one call unit of bandwidth for each of SR1, SR2, thereby allowing simultaneous use of link L1 by both SR1 and SR2.

Figure 3:
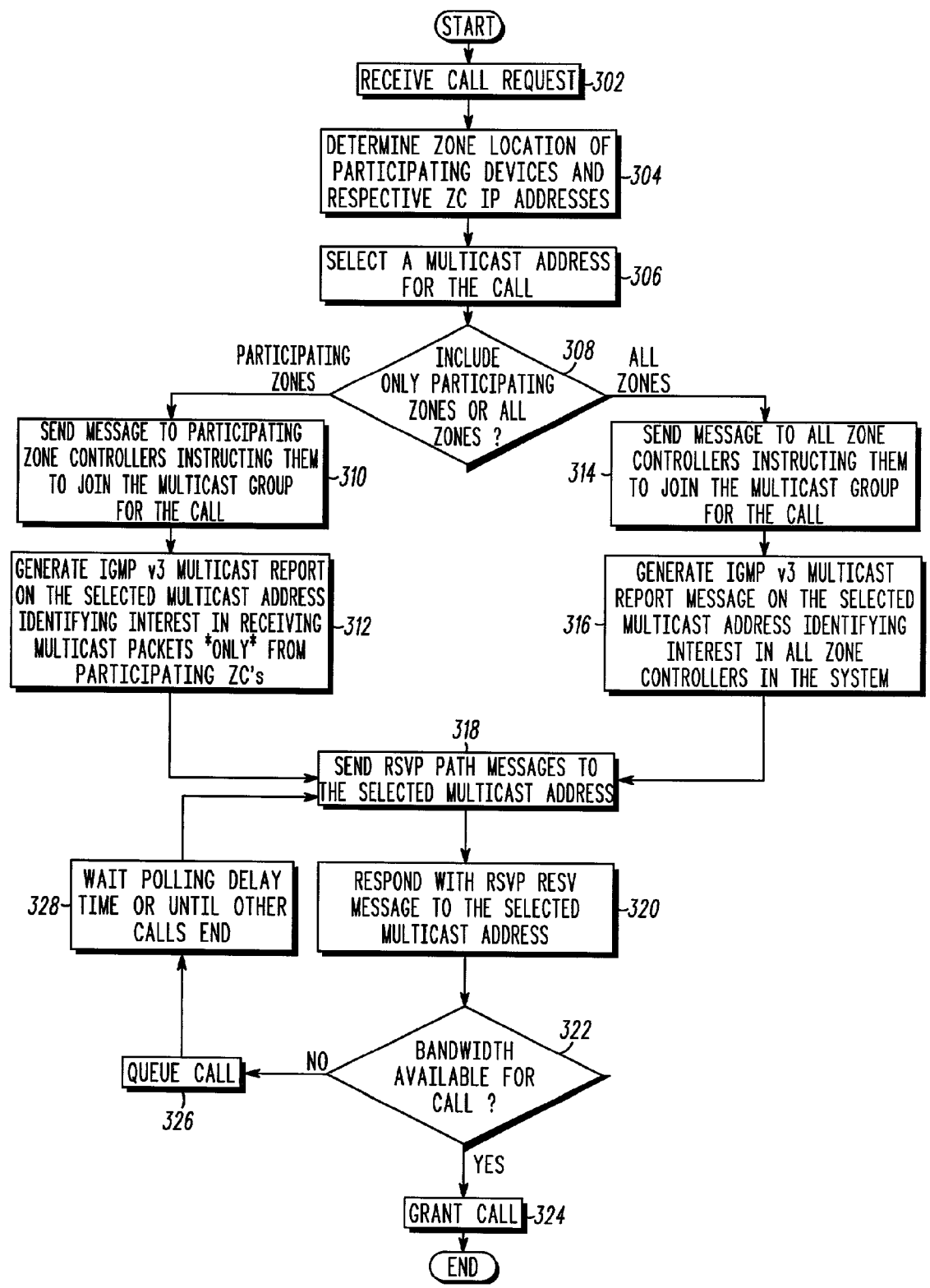
FIG. 3 is a flowchart showing steps performed by zone controller/RPE(s) to set up a prospective multicast call according to one embodiment of the invention.

FIG. 3 shows steps performed by participating RPEs to set up a prospective multicast call according to one embodiment of the invention. The flow chart of FIG. 3 presumes that the RPEs reside within respective zone controllers and hence, perform call processing and mobility management functions as well as reservation proxy functions. However, as will be appreciated, similar functionality may be achieved by separate devices performing call processing and mobility management functions (i.e., where the RPEs and zone controllers are separate devices), assuming the RPEs are in communication with participating zone controllers.

At step 302, a controlling zone controller/RPE receives a call request for a prospective call (e.g., a talkgroup call). The controlling zone controller may be statically configured or defined on a call by call basis (e.g., the zone controller of a sourcing zone). The call request may be received, for example, from a wireless communication device, such as a mobile or portable radio, wireline communication device, console (wireless or wireline), base station, site controller, comparator, telephone interconnect device or internet protocol telephony device; or, in the case where the call request is sourced from a zone other than that of the controlling zone controller, the call request may be forwarded to the controlling zone controller from a zone controller associated with the sourcing zone.

For example, with reference to FIG. 1, controller 128 (zone 3) may receive a call request from communication unit 158, via base site 106 (not shown). If zone controller 128 is not the controlling zone controller, it forwards the call request to the controlling zone controller at step 302. For convenience, it is presumed for purposes of the present example that zone controller 128 is the controlling zone controller.

At step 304, the controlling zone controller/RPE determines zone locations of participating devices and IP addresses of their respective zone controllers. Thus, continuing the present example, controlling zone controller 128 (zone 3) may determine that the call involves communication units 156–157 (zone 2), 158–160 (zone 3) and 161–163 (zone 4). In such case, the zone controller 128 determines that zone controllers 126 (zone 2) and 130 (zone 4) are participating zone controller/RPEs for the call (in addition to itself) and identifies the IP addresses of the participating zone controller/RPEs.

At step 306, the controlling zone controller/RPE selects a multicast group address that is to be used for the call. In one embodiment, the multicast group address comprises an address that is to be used for exchanging control messages (e.g., call processing, mobility management and RSVP signaling) between participating zone controller/RPEs during call set-up, as described in relation to FIG. 3, and also to be used for communicating payload information between participating devices when the call is granted. However, according to principles of the present invention, the zone controller/RPEs may filter out the payload messages, as will be described. In a preferred embodiment, the controlling zone controller identifies the multicast group address dynamically, on a call-by-call basis. Alternatively, static multicast group addresses associated with various talkgroup IDs may be stored in memory and then recalled upon receiving a call request, as appropriate.

In one embodiment, the multicast group address is communicated in either of two manners—to only the participating zone controller/RPEs or all zone controller/RPEs of the network. The controlling zone controller determines at step 308 whether to include only participating zones or all zones in the prospective call.

If only participating zones are to be included, the controlling zone controller/RPE sends at step 310 the multicast group address to the participating zone controller/RPEs, which in effect instructs the RPEs to join the multicast group address to participate in the call. Alternatively, message(s) instructing the participating zone controller/RPEs to join the selected multicast address may be sent separately from the message(s) informing them of the multicast address. Thereafter, at step 312, one or more of the participating zone controller/RPEs may specify a desired filtering of multicast packets for the call. In one embodiment, all of the participating zone controller/RPEs generate IGMPv3 multicast report(s) on the selected multicast address identifying interest in receiving multicast packets only from other participating zone controller/RPEs. In such manner, all of the zone controller/RPEs, upon joining the multicast address, will receive only control messages from the participating zone controller/RPEs and hence will not receive payload sourced from base stations or dispatch consoles in the participating zones.

It should be noted, whereas the present invention provides for zone controllers/RPEs using IGMPv3 to specify desired filtering of multicast traffic, it is not necessary for other participating devices to use IGMPv3. System designers may employ IGMPv2 (which does not allow for devices to specify filtering) in devices (e.g., base stations) that are not desired to filter out payload or control messages from any source. Alternatively, IGMPv3 could be used in these devices, but generally that would require such devices to generate IGMPv3 reports specifying all sources as valid senders. IGMPv2 is preferred because it would allow such devices to receive packets from all senders by simply joining the multicast address without the need to generate any additional reports.

If all zones are to be included, the controlling zone controller sends at step 314 message(s) to all zone controller/RPEs of the network informing them of the selected multicast address and instructing them to join the multicast address to participate in the call. Thereafter, at step 316, one or more of the zone controller/RPEs may specify a desired filtering of multicast packets for the call, using IGMPv3 substantially as has been described in relation to step 312 to receive only control messages from the participating zone controller/RPEs when joined to the multicast address.

At step 318, each zone controller/RPE having joined the multicast address sends an RSVP path message or other suitable control message destined to the multicast group address. Upon reception of a path message, each zone controller/RPE responds at step 320 with an RSVP reserve message that essentially retraces the path of the received path message. The reserve message may incorporate the Wildcard Filter, Shared Explicit or Fixed Filter RSVP protocols, as described in relation to FIG. 2. In one embodiment, each reserve message requests confirmation from the network once the reservation is established.

In the preferred embodiment, each participating zone controller/RPE sends both path messages and reserve messages so as to establish two reservations on the affected inter—zone links-one in each direction. Thus, new reservations do not need to be established when the sourcing site changes from one zone to another during the call.

At step 322, the zone controller/RPE(s) determine an availability of communication resources (e.g., bandwidth) on the inter-zone links based on receiving (or not receiving) confirmation from the network that the appropriate reservation(s) are established for the prospective call. According to RSVP protocols, the receiving hosts (i.e., those sourcing RSVP reserve messages) request confirmation from the network as to the RSVP reservation availability. In the preferred embodiment, each participating zone controller/RPE acts as a receiving host, thus each participating zone controller/RPE receives confirmation from the network as to the availability of bandwidth on its requested link reservation(s).

If bandwidth is available, the controlling zone controller/RPE grants the call at step 324. Otherwise, if bandwidth is not available, the call request is queued (or "busied") at step 326 and the controlling zone controller waits at step 328 for a polling delay time or until other call ends, and the process returns to step 318 to re-attempt a reservation of bandwidth for the call.

Figure 4:
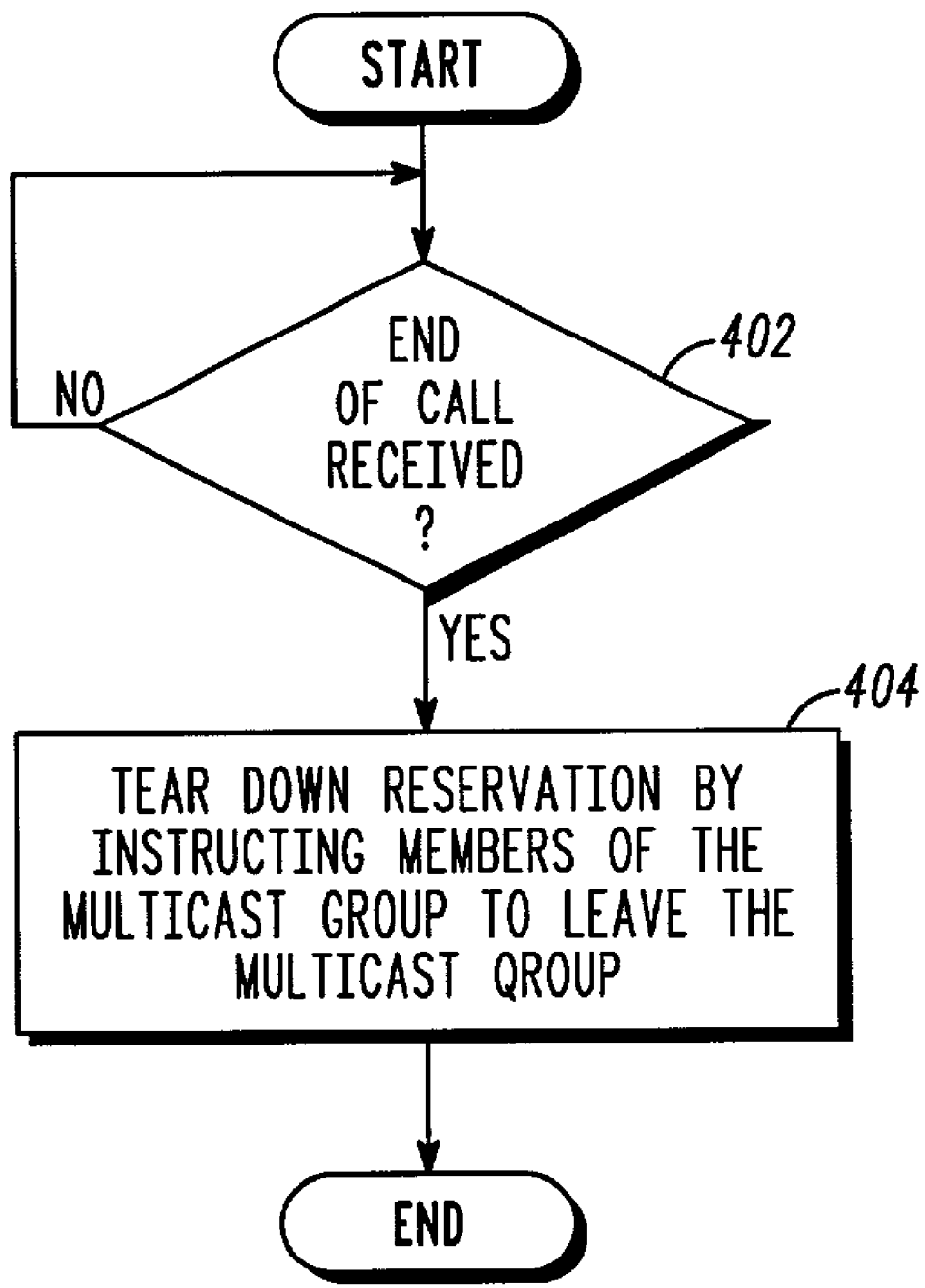
FIG. 4 is a flowchart showing steps performed by a controlling zone controller/RPE(s) upon ending of a multicast call according to one embodiment of the invention.

FIG. 4 shows steps performed by a controlling zone controller/RPE upon end of a multicast call according to one embodiment of the invention. At step 402, it is determined whether the call is ended. This may occur, for example, if no call activity occurs for a designated "hang time" period, and/or upon receiving End of Call message(s) from certain hosts. For instance, continuing the example of FIG. 3, controlling zone controller 128 (zone 3) may receive an End of Call message from communication unit 158, via base site 106 (not shown).

If the call is ended, the controlling zone controller instructs the participating devices to leave the multicast group at step 404, thereby causing the reservations to be torn down. As is well known, this may be accomplished by the participating devices sending IGMP "Leave" messages to their attached routers. The routers, in turn, de-establish the appropriate multicast routing trees based on the Leave messages.

Figure 5:
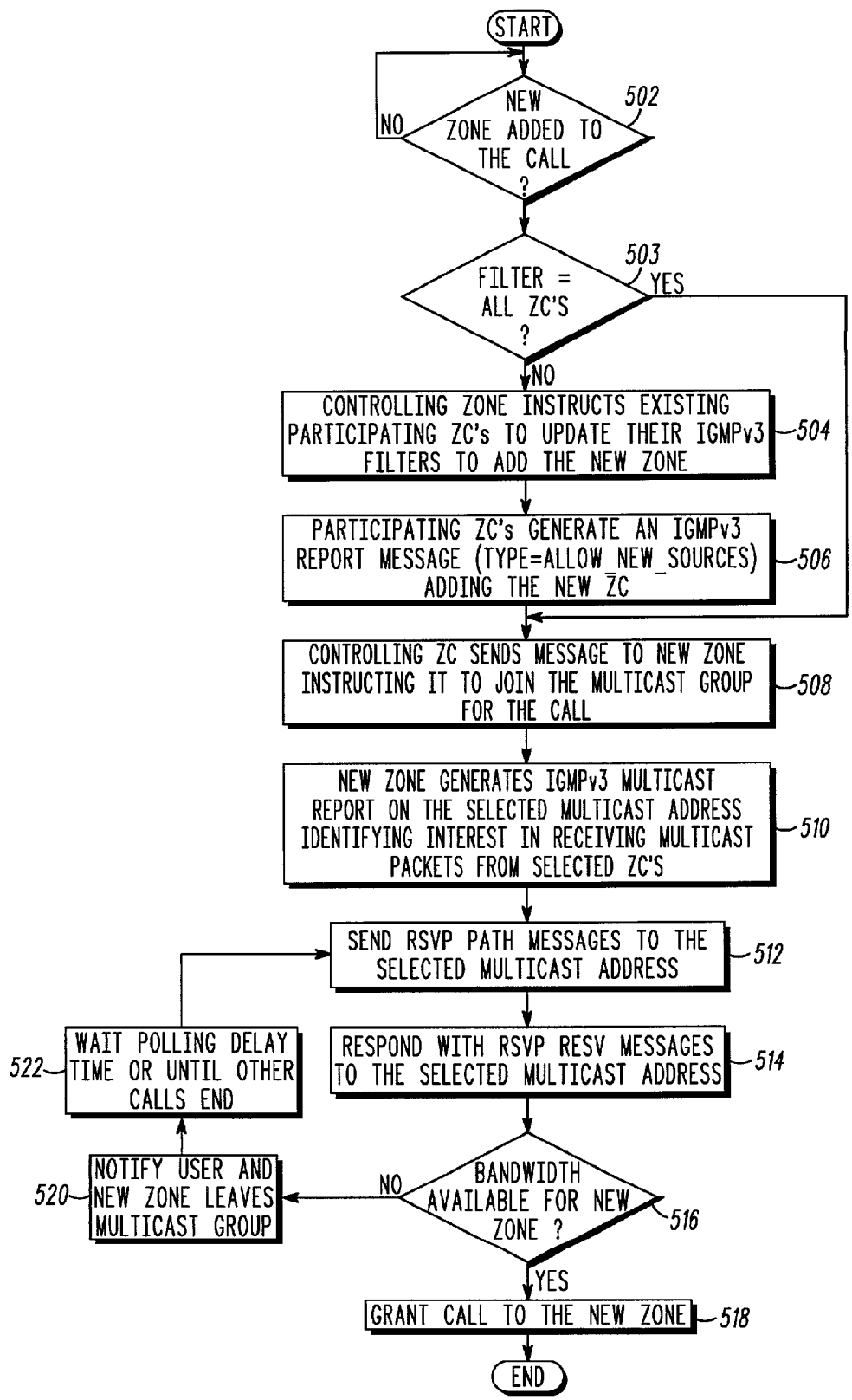
FIG. 5 is a flowchart showing steps performed by zone controller/RPE(s) to add new participating zones for a call in progress according to one embodiment of the present invention.

FIG. 5 shows steps performed by participating RPEs to add new participating zones to a multicast call in process according to one embodiment of the invention. The flow chart of FIG. 5, like FIG. 3, presumes that the RPEs reside within respective zone controllers and hence, perform call processing and mobility management functions as well as reservation proxy functions. However, as will be appreciated, similar functionality may be achieved by separate devices performing call processing and mobility management functions.

At step 502, a controlling zone controller/RPE determines whether a new zone is to be added to a multicast call in process. This may occur, for example, upon the controlling zone controller receiving an affiliation message from a member of a talkgroup that has moved to a new zone during the talkgroup call, or from a zone controller of the new zone, as is known in the art. For instance, continuing the example of FIG. 3, controller 124 (zone 1) may receive an affiliation message from communication unit 156 (zone 2) moving to zone 1 during the call, via a base site 106 of zone 1. In such case, the controller 124 will forward the affiliation message or otherwise inform the controlling zone controller (e.g., controller 128, zone 3) of the new affiliation. The controlling zone controller 128 will determine that zone 1 needs to be added to the call in process because it wasn't included at the time of call set-up. The controlling zone controller 128 thereby determines that zone controller 124 (zone 1) is a new participating device for the call and identifies the IP addresses of the new zone controller 128.

At step 503, it is determined how multicast packets are presently being filtered for the call, i.e., whether participating zone controller/RPEs have specified, by IGMPv3 filtering, that packets may be received from all zone controllers, or only participating zone controllers of the system. If all zones are included, the process proceeds to step 508. If only participating zone controllers are presently included, the controlling zone controller instructs at step 504 the existing participating zone controller/RPEs to update their IGMPv3 filters to add the new zone. At step 506, the existing participating zone controllers (including the controlling zone controller) generate an IGMPv3 report message (Type=Allow_New_Sources) adding the new zone controller. Thus, in the present example, zone controller 128 instructs zone controllers 126 (zone 2) and 130 (zone 4) to add zone controller 124 (zone 1) as a valid source of multicast traffic for the call at step 504, and the zone controllers 126, 128, 130 each generate an IGMPv3 report message adding zone controller 124 at step 506.

At step 508, the controlling zone controller/RPE sends the multicast group address for the call to the zone controller/RPE of the new zone, which in effect instructs the new zone controller/RPE to join the multicast group address to participate in the call. Alternatively, message(s) instructing the new zone controller/RPE to join the multicast address may be sent separately from the message(s) informing it of the multicast address. Thereafter, at step 510, the new zone controller/RPEs may specify a desired filtering of multicast packets for the call. In one embodiment, this is accomplished by the new zone controller/RPE (e.g., zone controller 124, zone 1) generating IGMPv3 multicast report(s) on the indicated multicast address identifying interest in receiving multicast packets only from other participating zone controller/RPEs. In such manner, the new zone controller/RPE, upon joining the multicast address, will receive only control messages from the participating zone controller/RPEs and hence will not receive payload sourced from base stations or dispatch consoles in the participating zones.

At step 512, the new participating zone's RPE generates a RSVP PATH message on the indicated multicast group. In addition, the controlling zone's RPE generates a RSVP PATH message on the indicated multicast group. Generally, any originally-participating RPE may generate the second PATH message, but it is preferred that the second path message is generated by the controlling zone's RPE since it is the controller of the group session. Thus, to add a new path, it is not necessary for all RPEs to generate a path message—just the new RPE and one other, preferably the controlling zone's RPE. Upon reception of a RSVP PATH message, each zone controller/RPE responds at step 514 with an RSVP RESV message that essentially retraces the path of the received RSVP PATH message. The reserve operation may incorporate the Wildcard Filter, Shared Explicit Filter or Fixed Filter RSVP protocols as described in relation to FIG. 2.

At step 516, the zone controller/RPE(s) determine an availability of communication resources (e.g., bandwidth) on added link(s) to the new zone based on receiving (or not receiving) confirmation from the network that the appropriate reservation(s) are established for the call, substantially as described in relation to FIG. 3. If bandwidth is available, the controlling zone controller/RPE grants the call to the new zone at step 518. Otherwise, if bandwidth is not available, the user in the new zone is notified at step 326 and the new zone leaves the multicast group. The controlling zone controller and the new zone controller wait at step 522 for a polling delay time or until other call ends, and the process returns to step 510 to re-attempt a reservation of bandwidth for link(s) to the new zone.

The present disclosure therefore identifies methods of call set-up and control in a packet-based communication system that rely upon reservation proxy elements (RPEs) establishing reservations of bandwidth over inter-zone links, which reservations may be used by participating devices for active calls. Advantageously, the reservations are established on a call-by-call basis using RSVP signaling addressed to a multicast group address that is also used for the active calls. The RSVP signaling by RPEs, rather than participating endpoints, reduces call set-up time and improves scalability of the communication system. Further, by providing for the RPEs to use IGMPv3 reports to specify valid senders, desired control traffic is received by the RPEs without receiving undesired payload traffic.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a communication system organized into a plurality of communication zones having respective zone controllers, one or more of the zone controllers defining participating zone controllers having joined a multicast group address to participate in a call and having indicated, to one or more network devices, a desire to receive packets from certain specified senders during the call, a method comprising:
   determining that a new zone should be added to the call;
   redefining the specified senders to include a new zone controller associated with the new zone;
   joining, by the new zone controller, the multicast group address;
   sending, by the new zone controller to the one or more network devices, one or more messages defining the participating zone controllers as eligible senders from which packets addressed to the multicast group address are eligible to be received during the call; and
   exchanging control messages between the new zone controller and the eligible senders to establish a reservation of communication resources for the new zone on behalf of participating hosts in the new zone.

2. The method of claim 1, wherein the step of redefining the specified senders comprises sending, from the participating zone controllers to the one or more network devices, IGMPv3 membership reports specifying the new zone controller as an eligible sender.

3. The method of claim 1, wherein the step of exchanging control messages comprises exchanging RSVP path and reserve messages between the new zone controller and the eligible senders.

4. The method of claim 1, wherein the step of exchanging control messages comprises exchanging call control information indicating an availability of the reservation of communication resources for the new zone, the method further comprising steps of:
granting the call to the new zone; and
instructing the participating hosts in the new zone to join the multicast group address to participate in the call.

5. The method of claim 1, wherein the step of sending comprises sending IGMPv3 membership reports identifying only specified reservation proxy elements as eligible senders.

6. The method of claim 5, wherein the specified reservation proxy elements comprise zone controllers associated with certain zones of the communication system.

7. The method of claim 6, wherein the specified reservation proxy elements comprise zone controllers associated with all zones of the communication system.

8. The method of claim 6, wherein the specified reservation proxy elements comprise zone controllers associated only with participating zones of the communication system, the participating zones defining zones that include participating devices for the prospective call.

9. The method of claim 6, wherein the step of exchanging control messages comprises exchanging call control information with the specified zone controllers.

10. The method of claim 9, wherein the call control information includes indicia of availability of the reservation of communication resources for the prospective call, the method comprising at least one zone controller of the specified zone controllers performing steps of:
granting the prospective call, thereby forming an active call; and
instructing the participating hosts to join the multicast group address to participate in an active call.

11. The method of claim 10, further comprising:
sourcing, by a sourcing host during the active call, information addressed to the multicast group address; and
distributing the information, from the network devices to participating hosts having joined the multicast address.

12. The method of claim 10, wherein the call control information includes indicia of an end of the active call, the method comprising the at least one zone controller instructing the participating hosts to leave the multicast group address to end participation in the call.

* * * * *